(12) United States Patent
Bauer et al.

(10) Patent No.: US 6,176,908 B1
(45) Date of Patent: Jan. 23, 2001

(54) AQUEOUS INK JET INKS FOR POSTAL METERING

(75) Inventors: Richard D. Bauer, Kennett Square, PA (US); John Morrow Gardner; Loretta Ann Grezzo Page, both of San Diego, CA (US); David Alvin Tyvoll, La Jolla, CA (US)

(73) Assignee: E. I. du Pont de Nemours and Company, Wilmington, DE (US)

( * ) Notice: Under 35 U.S.C. 154(b), the term of this patent shall be extended for 0 days.

(21) Appl. No.: 09/399,260

(22) Filed: Sep. 20, 1999

(51) Int. Cl.[7] .................................................. C09D 11/00
(52) U.S. Cl. ..................... 106/31.15; 106/31.28; 106/31.32; 106/31.64; 106/31.58; 106/31.86; 252/301.35
(58) Field of Search ............................. 106/31.15, 31.28, 106/31.32, 31.64, 31.58, 31.86; 252/301.35

(56) References Cited

U.S. PATENT DOCUMENTS

| | | | | |
|---|---|---|---|---|
| 4,186,020 | * | 1/1980 | Wachtel ............................. | 106/31.32 |
| 5,106,417 | | 4/1992 | Hauser et al. ...................... | 106/20 |
| 5,135,569 | * | 8/1992 | Mathias .............................. | 106/31.32 |
| 5,531,818 | | 7/1996 | Lin et al. ............................ | 106/23 C |
| 5,702,511 | * | 12/1997 | de Saint-Romain et al. ..... | 106/31.32 |
| 5,755,860 | * | 5/1998 | Zhu .................................... | 106/31.15 |

FOREIGN PATENT DOCUMENTS 10 130558    5/1998  (JP).

* cited by examiner

Primary Examiner—Mark L. Bell
Assistant Examiner—Veronica F. Faison
(74) Attorney, Agent, or Firm—Joseph A. Tessari

(57) ABSTRACT

Aqueous, fluorescent red ink jet inks which meet US Postal Service requirements for metered mail are disclosed and comprise an aqueous vehicle, a red or magenta pigment, a polymeric dispersant, a fluorescent dye and, optionally a hydrotrope additive.

8 Claims, 1 Drawing Sheet

AQUEOUS INK JET INKS FOR POSTAL METERING

BACKGROUND OF THE INVENTION

This invention relates to aqueous printing inks and, more particularly, to aqueous, pigmented, red ink jet ink compositions which meet the stringent postal requirements and are thus suitable for use in printing postal indicia.

Ink jet ink printing is a form of digital printing in which droplets of ink are made to be ejected (i.e., "fire") from an orifice in a printhead or a spray nozzle in response to an electronic signal from, for example, a computer. Examples of ink jet printing include thermal ink jet printing, piezo-electric ink jet printing, continuous ink jet printing and air brush printing.

In the past decade, ink jet printing, particularly the thermal and piezo forms, has become extremely popular for home office, small office and personal printer applications, primarily due to its relatively low cost, speed and quite operation. In more recent years, the popularity of ink jet printing has increased even further due to the introduction of systems (printers, software, media and inks) offering very high quality (near photographic) color and graphics capabilities.

Postal authorities around the world require specialized indicia be used when the postage is applied to the mail by machine ("metered mail"), as opposed to when stamps are used for postage. Typically this indicia identifies the amount of the postage, the location of origin of the mail and often will identify the registered user of the device used to print the indicia. Because the machines that apply the postal indicia are, in effect, printing money, they are typically very strictly monitored. In addition, to avoid fraud, survive the elements, and to facilitate automated mail handling, the indicia must meet strict requirements. For example, the indicia must be readable after being immersed in water for 24 hours. It must be resistant to bleaching or removal with other solvents to prevent tampering with the postal amount. In the US and in some other countries, it must also be fluorescent on a variety of envelopes so that it is readable by a facer-canceller. It must be smudge and smear resistant to remain readable with repeated handling.

For many years, the postal indicia was applied with a stand alone metering device. The device was, in effect, a relatively sophisticated stamping device in which the postal amount was set by the user and the envelope was passed through the device to be metered and the appropriate postage applied. The ink used for the indicia was a fluorescent red ink applied with a stamp. Recently, ink jet based products have been introduced on the market for applying postal indicia to envelopes.

Despite its commercial success and Post Office approval, the inks used in the commercially available ink jet postal metering devices are inferior to the stamping inks previously used for postal metering in the sense that they do not satisfy some of the postal criterion mentioned above. For example, while the inks used in these commercial devices satisfy the fluorescence requirements, they do not perform well in the water immersion test or the bleach resistance test. Accordingly, there is a need in the art for aqueous red ink jet inks that can satisfy the demanding postal criterion for use in metering mail.

SUMMARY OF THE INVENTION

The invention comprises an ink jet ink consisting essentially of a) an aqueous vehicle
b) at least one pigment selected from the group consisting of red pigments and magenta pigments;
c) a polymeric dispersant; and
d) a fluorescent dye;
   wherein said ink is suitable for use in metering mail.

DETAIL DESCRIPTION OF THE EMBODIMENTS

Figure 1:
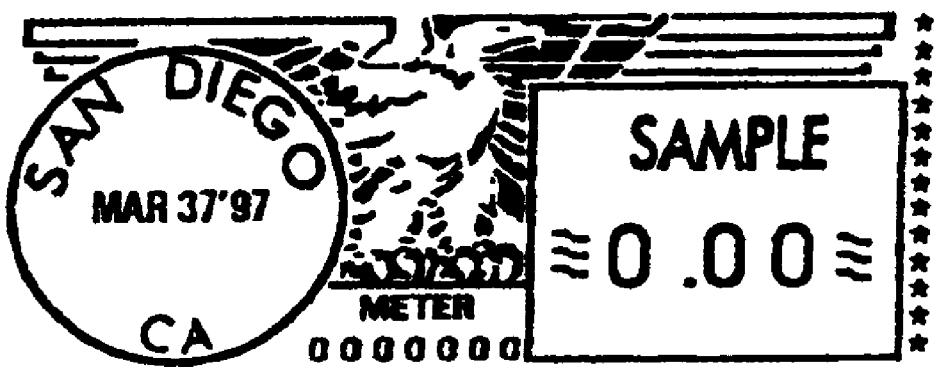
FIG. 1 is a representative postal metered mail indicia approved by the United States Postal Service.

The present invention is based on the surprising discovery that the mixture of pigments and fluorescent dyes could be used to produce an ink suitable for use in metering mail. Prior to the present invention, it was known in the art that pigments were needed for waterfastness in inks. It was also known that pigments quench fluorescence as does the addition of excess fluorescent dye. Thus, prior to this invention, conventional wisdom suggested that obtaining sufficient fluorescence and waterfastness to meet postal requirements using a mixture of pigments and fluorescent dyes was not possible.

As used in this specification, the phrase "suitable for use in metering mail" means that a representative metered mail indicia of the US Postal Service (see FIG. 1) printed with the ink meets the requirements set forth by the United States Postal Service, as follows:

The indicia is readable with the unaided eye after 24 hours immersion in water;

The indicia is sufficiently resistant to organic solvents and bleaching agents to prevent fraudulent alteration of the indicia without defacing the envelope;

The indicia produces at least 7 Phosphor Meter Units ("PMU") of fluorescence when irradiated and detected by an Advanced Facer-Canceler System ("AFCS")or LM-2C Luminance Meter ("LM-2C") when printed on an envelope, preferably on a Kraft paper envelope, using a standard US Postal Service metered mail indicia substantially in the form of FIG. 1 at an ink drop volume per pixel ratio of 30 picoliters per 600 dpi pixell. The AFCS and LM-2C are devices approved for use by the US Postal Service and essentially detect fluorescence at 600 mn (±50 nm) when irradiated at 254 nm or at 365 nm.

Aqueous Vehicle

The aqueous vehicle is a mixture of water and at least one water soluble or water miscible organic solvent, such as a glycol or glycol ether. Deionized water is typically used in ink jet inks. Representative water-miscible glycols and glycol ethers are well known to those skilled in the art and include those disclosed in U.S. Pat. No. 5,221,334, the entire disclosure of which is incorporated herein by reference. The aqueous vehicle may also contain other co-solvents, such as pyrrolidones (e.g., N-methyl pyrrolidone, 2-pyrrolidone, etc.) also disclosed in U.S. Pat. No. 5,221,334 and incorporated herein.

The precise composition of the aqueous vehicle will vary depending upon the type of printer being used, and the type and amount of other components of the ink. Generally speaking, however, the vehicle comprises no more than 80%, preferably 60–70%, water, a glycol, a glycol ether and pyrrolidone. Particularly preferred vehicle compositions are set forth in the examples. The aqueous vehicle generally comprises 70 to 99.8%, by weight of the total ink composition.

Colorants

The inks of this invention contain both pigment and dye colorants. The term "dye" means a colorant that becomes soluble at some point during the printing process (e.g., under heat and/or pressure). The term "pigment" means a colorant that is insoluble (i.e., in particulate or crystalline form) throughout the printing process.

The inks of the invention contain at least one red or magenta pigment and a fluorescent red dye. The inks may also contain a yellow pigment and/or yellow dye, which may be either fluorescent or non-fluorescent, to adjust the final color of the ink. While most postal authorities require a red color, the exact shade of red will vary from country to country. Red and yellow pigments and dyes are readily available from commercial sources and are well known to those skilled in the art. The pigments are normally used at concentrations of 0.1% to 5% by weight, based on the total weight of the ink. The fluorescent red dye is typically used in concentrations of 0.05% to 2% by weight, based on the total weight of the ink. The amount of other dyes used, if any, will vary depending upon the desired end color, but generally will be on the order of a 2–3% weight or less.

Dispersant

The inks of the invention contain a polymeric dispersant to disperse the pigment particles and dye (if a dispersed dye is selected). The polymeric dispersants include random polymers and structured polymeric dispersants such as block copolymers and branched-type polymers. The polymers may be anionic, cationic or non-ionic in nature. If the polymer is ionic, it need not have the same ionic character as the dye. In other words, the ink may contain anionic pigment dispersions with either anionic or cationic dyes, or cationic pigment dispersions with cationic dyes.

Random polymers are not as effective in stabilizing colorant dispersions as structured polymers and, therefore, are not preferred. However, a random polymer which has both hydrophilic sections for aqueous solubility and hydrophobic sections for interaction with the colorant and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (colorant binding) block for stronger specific interactions between the colorant and the polymer dispersant to give an improved dispersion stability. These polymers are known in the art.

The amount of the polymer depends on the structure, molecular weight and other properties of the polymer, and on the other components of the ink composition. The dispersant polymers that are selected in practicing the invention have number average molecular weight of below 40,000, preferably below 20,000, and typically in the range of 2,000 to 10,000.

The polymeric dispersant may be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Other Ingredients

The inks of the invention may contain other ingredients or additives that are typical for ink jets inks. For example the inks may contain surfactants to adjust surface tension or viscosity. Care must be taken not to select a surfactant which will destabilize the pigment dispersion, however. Other conventional ink additives as are known to those skilled in the art include biocides, sequestering agents, humectants, coalescents, viscosity modifiers, defoaming agents, UV absorbers, and corrosion inhibitors.

In addition to the conventional ink jet ink additives mentioned above, the inks of this invention may contain hydrotrope additives to enhance fluorescence. Such additives include sulfonated diphenyl ether hydrotropes, sulfonated or carboxylated naphthalene hydrotropes, and condensed naphthalene sulfonate polymers. Amounts of as little as 0.5% by weight, based on the total weight of the ink, of such additives has been demonstrated to improve fluorescence. Amounts higher than 8–10% by weight produce no additional fluorescence.

Ink Properties

Jet velocity, separation length of the droplets, drop size, and stream stability are greatly affected by the surface tension and the viscosity of the ink. Pigmented ink jet inks generally should have a surface tension in the range of about 15 dyne/cm to about 70 dyne/cm and preferably in the range 15 dyne/cm to about 35 dyne/cm. Acceptable viscosities are no greater than about 30 cP at 25° C., and preferably in the range of about 1.0 cP to about 15.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of inkjet printers such as continuous, piezoelectric drop-on-demand and thermal or bubble jet drop-on-demand, air brush and valve jet printers. The inks have excellent storage stability for a long period and do not clog in an ink jet apparatus.

EXAMPLES

Polymer #1: benzyl methacrylate-b-methacrylic acid (13//10)

A 12-liter flask was equipped with a mechanical stirrer, thermometer, N2 inlet, drying tube outlet, and addition funnels. Tetrahydrofuran, 3750 gm, and p-xylene, 7.4 gm, were charged to the flask. The catalyst tetrabutyl ammonium m-chlorobenzoate, 3.0 ml of a 1.0 M solution in acetonitrile, was then added. Initiator, 1,1 -bis(trimethylsiloxy)-2-methyl propene, 291.1 gm (1.25 M) was injected. Feed I [tetrabutyl ammonium m-chlorobenzoate, 3.0 ml of a 1.0 M solution in acetonitrile] was started and added over 180 minutes. Feed II [trimethylsilyl methacrylate, 1975 gm (12.5 M)] was started at 0.0 minutes and added over 35 minutes. One hundred minutes after Feed II was completed (over 99% of the monomers had reacted) Feed III [benzyl methacrylate, 2860 gm (16.3 M) was started and added over 30 minutes. At 400 minutes, 720 gm of methanol was added to the above solution and distillation begins. During the first stage of distillation, 1764.0 gm of material was removed. Then more methanol 304.0 gm was added and an additional 2255.0 gm of material was distilled out. It was at 50% solids.

Polymer #2: butyl acrylate-co-methyl acrylate-co-2-acrylamido-2-methylpropane sulfonic acid-sodium salt-g-methacrylic acid-co-ethoxytriethyleneglycol methacrylate (35/35/05-g-/26/4)

Step 1, Preparation of Macromonomer

A 2-liter flask was equipped with a mechanical stirrer, thermometer, N2 inlet, drying tube outlet, and addition funnels. Acetone, 126 gm, methanol, 155 g, and isopropanol 124 gm were charged to the flask and heated to reflux temperature. Feed I [ethoxytriethyleneglycol methacrylate, 30.7 gm, methacrylic acid, 215.5 gm, and methanol, 40.5 gm] was started and added over 240 minutes. Concurrently with Feed I, Feed II [a solution of acetone, 90.2 gm, diaquabis(borondifluorodiphenyl-glyoximato) cobalt (II), 0.198 gm, and VAZO® 52 (DuPont), 7.2 gm] was added over 240 minutes. The reaction was held at reflux and additional 120 minutes. The reaction mixture yielded 33.2% solids.

Step 2, Preparation of Graft Copolymer

A 2-liter flask was equipped with a mechanical stirrer, thermometer, N2 inlet, drying tube outlet, and addition funnels. The macromonomer solution from above, 547 gm, butyl acrylate, 17.5 gm, methyl acrylate, 15 gm, 2-acrylamido-2-methylpropane sulfonic acid-sodium salt, 5 gm, water, 5 gm, and N-methyl pyrrolidone, 15 gm were charged to the flask and heated to reflux temperature. Lupersol® 11 initiator, 3.75 gm dissolved in isopropanol, 15 gm, were added in one shot. Feed 1 [butyl acrylate, 157.5 gm, methyl acrylate, 135 gm, 2-acrylamido-2-methylpropane sulfonic acid-sodium salt, 45 gm, water 45 gm, and N-methyl pyrrolidone,135 gm ] were added over 240 minutes. Concurrently with Feed I, Feed II [Lupersol® 11, 9 gm and isopropyl alcohol, 36 gm] was added to the flask. At the end of the reaction, 1 gm Lupersol® in 4 gm isopropanol were added in one shot. The reaction was refluxed for an additional 60 minutes. The final product was 51.5% solids.

Polymer #3: benzyl methacrylate-b-dimethylaminoethyl methacrylate-co-ethoxytriethyleneglycol methacrylate (10/120/3)

A 12-liter flask was equipped with a mechanical stirrer, thermometer, N2 inlet, drying tube outlet, and addition funnels. Tetrahydrofuran, 3454 gm, and p-xylene, 7.7 gm, was charged to the flask. The catalyst tetrabutyl ammonium m-chlorobenzoate, 2.2 ml of a 1.0 M solution in acetonitrile, was then added. Initiator,1-methoxy-1-trimethylsiloxy-2-methyl propene, 155.1 gm (0.891 M) was injected. Feed I [2-dimethylaminoethyl methacrylate, 2799 gm (17.8 M) and ethoxytriethylengylcol methacrylate, 658 g (2.7 M)] was started at 0.0 minutes and added over 45 minutes. One hundred minutes after Feed I was completed (over 99% of the monomers had reacted)Feed II [benzyl methacrylate, 1568 gm (8.91 M)] was started and added over 30 minutes. At 400 minutes, 465 gm of dry methanol was added to the above solution and distillation begun. A total of 465 gm of solvent was removed, which was replaced by isopropanol after completion of the distillation. The polymer was at 59% solids.

Dispersion #149-1

The following ingredients were mixed and the mixture charged to a two roll mill and processed for 30 minutes.

| INGREDIENTS | AMOUNT (gms) |
| --- | --- |
| Polymer #1 | 480 gms. |
| Pigment Red 149 | 360 gms. |
| (Clarient 13-4000 PV fast Red B) | |
| tetraethylene glycol | 78 gms. |

This made a pigment dispersion chip #1 that contained 53% pigment, 35% polymer, and 11.5% tetraethylene glycol. It had a pigment-to-dispersant ratio ("P/D")=1.5/1. The two roll mill PR149 chip #1 from the above process was then dissolved by mixing 678 gm of chip with 148.7 gm of tetraethylene glycol, 88.94 gm of 45.5% potassium hydroxide, and 1479.6 gm deionized water with adequate stirring to make an aqueous red pigment concentrate that contained 15% pigment and had 90 mole % of the acid groups neutralized.

Dispersion #149-2

The following ingredients were mixed and the mixture charged to a two roll mill and processed for 30 minutes.

| INGREDIENTS | AMOUNT (gms) |
| --- | --- |
| Polymer #2 | 391.4 gms |
| Pigment Red 149 | 300 gms. |
| (Clarient 13-4000 PV fast Red B) | |

This made a pigment dispersion chip #2 that contained 54% pigment, 36% polymer, and 9.4% N-methyl pyrrolidone. It had a P/D=1.5/1. The two roll mill PR149 chip #2 from the above process was then dissolved by mixing 168.3 gms of the chip with 20.07 gm of 45.5% KOH and 416.8 gm deionized water with adequate stirring to make an aqueous red pigment concentrate that contained 15% pigment and had 90 mole % of the acid groups neutralized.

Dispersion #149-3

The following ingredients were mixed and the mixture charged to a two roll mill and processed for 30 minutes.

| INGREDIENTS | AMOUNT (gms) |
| --- | --- |
| Polymer #3 | 405 gms. |
| Tetraethylene glycol | 18 gms. |
| Pigment Red 149 | 360 gms. |
| (Clarient 13-4000 PV fast Red B) | |

This made a pigment dispersion chip #2 that contained 58.3% pigment, 38.7% polymer, and 2.9% tetraethylene glycol. It had a P/D=1.5/1. The two roll mill PR149 chip #3 from the above process (156.9 gm) was then dissolved by mixing with 23.1 gm tetraethylene glycol, 11.9 gm of 85.6% phosphoric acid, and 418 gm of deionized water with adequate stirring to make an aqueous red pigment concentrate that contained 15% pigment and had 90 mole % of the amine groups neutralized.

Dispersion #122-1

The following ingredients were mixed and the mixture charged to a two roll mill and processed for 30 minutes.

| INGREDIENTS | AMOUNT (gms) |
| --- | --- |
| Polymer #1 | 480 gms. |
| Pigment Red 122 | 706 gms |
| (59.9% solids presscake sold as 428- | |
| 5024 from Sun Chemical Corp, | |
| Cincinnati, Ohio) | |
| Diethylene glycol | 75 gms |

This made a pigment dispersion that contained 58.2% pigment, 38.8% polymer, and 9.7% diethylene glycol. It had a P/D=1.5/1. The PR122 chip #1 from the above process (136.6 gm) was then dissolved using potassium hydroxide (18.9 gm of 45.5% solution) as the neutralizing agent in 374.5 gm deionized water with adequate stirring to make an aqueous red pigment concentrate that contained 15% pigment and had 90 mole % of the acid groups neutralized.

Dispersion #128-1

The following ingredients were mixed and the mixture charged to a two roll mill and processed for 30 minutes.

| INGREDIENTS | AMOUNT (gms) |
|---|---|
| Polymer #1 | 540 gms. |
| Pigment Yellow 128 (from Ciba Geigy Corporation) | 330 gms. |
| Diethylene glycol | 108 gms. |

This made a pigment dispersion that contained 49.3% pigment, 40.3% polymer, and 10.4% diethylene glycol. It had a P/D=1.22/1. The two roll mill PY128 chip #1 from the above process (199.0 gm) was then dissolved using potassium hydroxide (30.1 gm of 45.5% solution) as the neutralizing agent in 421 gm of deionized water with adequate stirring to make an aqueous yellow pigment concentrate that contained 15% pigment and had 90 mole % of the acid groups neutralized.

Vehicle 1: Into a container containing about 1000 gms of deionized water was added with stirring 150 gms. of 2-pyrolidinone, 250 gms. of tetraethylene glycol, 250 gms. of Liponics® EG-1 (Lipo Chemicals), and 50 gms. of Tergitol® 15S-9 (Union Carbide Corp.). The solution was brought up to 2500 gms. with deionized water.

Vehicle 2: Into a container containing about 1000 gms of deionized water was added with stirring 200 gms. of 2-pyrolidinone, 200 gms. of triethylene glycol, 200 gms of tripropylene glycol monomethyl ether, 125 gms. of Multranol® 4012 (Bayer AG), 250 grams of tetraglyme, and 50 grams of Tergitol® 15S-9. The solution was brought up to 2500 gms. with deionized water.

Vehicle 3: Into a container containing about 1000 gms of deionized water was added with stirring 400 gms. of 2-pyrolidinone, 250 gms. of tetraethylene glycol, 250 gms. of Liponics® EG-1, 250 gms of isopropyl alcohol and 50 gms. of Tergitol® 15S-9. The solution was brought up to 2500 gms. with deionized water.

Ink Preparation: A series of inks were prepared using the above components. Ink batches were prepared by letting down the specified weight percent of pigment concentrate(s) into about 30 gms. of deionized water with stirring. The specified weight percent of any dye(s) or additives were pre-dissolved in 50 gms. of the vehicle concentrate and this was let down into the diluted pigment concentrate. The ink was brought up to 100gms., the pH was adjusted, and then filtered. The ink formulations used in the examples are set forth in Table 1. The components used in the ink formulations are identified in the list following the table.

TABLE 1

INK COMPOSITION

| Sample No. | Vehicle | Pigment Dispersion (wt. %) | Wt % Pigment | Fluorescent Dye (wt %) | Other dye (wt. %) | Hydrotrope Additive (wt %) | pH |
|---|---|---|---|---|---|---|---|
| 1-1 | 1 | — | — | AR52 (0.5) | AY7 (0.2) | — | 8.3 |
| 1-2 | 1 | 149-1 (3.3) | 0.5 | AR52 (0.5) | — | — | 8.3 |
| 1-3 | 1 | 149-1 (3.3) | 0.5 | AR52 (0.9) | — | — | 8.3 |
| 1-4 | 1 | 149-1 (6.7) | 1.0 | AR52 (0.5) | — | — | 8.3 |
| 1-5 | 1 | 149-1 (6.7) | 1.0 | AR52 (0.9) | — | — | 8.3 |
| 1-6 | 1 | 149-1 (10.0) | 1.5 | AR52 (0.5) | — | — | 8.3 |
| 1-7 | 1 | 149-1 (10.0) | 1.5 | AR52 (0.9) | — | — | 8.3 |
| 1-8 | 1 | 149-1 (13.3) | 2.0 | AR52 (0.5) | — | — | 8.3 |
| 1-9 | 1 | 149-1 (13.3) | 2.0 | AR52 (0.9) | — | — | 8.3 |
| 1-10 | 1 | 149-1 (20.0) | 3.0 | AR52 (0.5) | — | — | 8.3 |
| 1-11 | 1 | 149-1 (20.0) | 3.0 | AR52 (0.7) | — | — | 8.3 |
| 1-12 | 1 | 149-1 (26.7) | 4.0 | AR52 (0.5) | — | — | 8.3 |
| 1-13 | 1 | 149-1 (13.3) | 2.0 | AR52 (1.0) | — | — | 8.3 |
| 1-14 | 1 | 149-1 (13.3) | 2.0 | AR52 (2.0) | — | — | 8.3 |
| 1-15 | 1 | 149-1 (13.3) | 2.0 | AR52 (3.0) | — | — | 8.3 |
| 1-16 | 1 | 149-1 (20.0) | 3.0 | AR52 (1.0) | — | — | 8.3 |
| 1-17 | 1 | 149-1 (20.0) | 3.0 | AR52 (2.0) | — | — | 8.3 |
| 1-18 | 1 | 149-1 (20.0) | 3.0 | AR52 (3.0) | — | — | 8.3 |
| 1-19 | 1 | 149-1 (6.7) | 1.0 | AR52 (0.5) | AY7 (0.2) | — | 8.3 |
| 1-20 | 1 | 149-1 (6.7) | 1.0 | AR52 (0.5) | AY7 (0.4) | — | 8.3 |
| 1-21 | 1 | 149-1 (10.0) | 1.5 | AR52 (0.5) | AY7 (0.4) | — | 8.3 |
| 1-22 | 1 | 149-1 (6.7) | 1.0 | AR52 (0.5) | AY250 (0.4) | — | 8.3 |
| 1-23 | 1 | 149-1 (6.7) | 1.0 | AR52 (0.5) | DY96 (0.4) | — | 8.3 |
| 1-24 | 1 | 149-1 (6.7) | 1.0 | AR52 (0.5) | AY73 (0.4) | — | 8.3 |
| 1-25 | 1 | 149-1 (20.0) | 3.0 | AR52 (0.5) | DY96 (0.4) | — | 8.3 |
| 1-26 | 1 | 149-1 (20.0) | 3.0 | AR52 (0.5) | AY73 (0.4) | — | 8.3 |
| 1-27 | 1 | 122-1 (4.3) 128-1 (2.3) | 0.65 0.35 | AR52 (0.5) | AY73 (0.5) | — | 8.3 |
| 1-28 | 1 | 122-1 (8.6) 128-1 (4.6) | 1.3 0.7 | AR52 (0.5) | AY73 (0.5) | — | 8.3 |
| 1-29 | 1 | 122-1 (12.9) 128-1 (6.9) | 1.9 1.1 | AR52 (0.5) | AY73 (0.5) | — | 8.3 |
| 1-30 | 1 | 122-1 (2.6) 128-1 (1.4) | 2.6 1.4 | AR52 (0.5) | AY73 (0.5) | — | 8.3 |
| 1-31 | 1 | 149-2 (6.7) | 1.0 | AR52 (0.5) | AY73 (0.5) | — | 8.3 |
| 1-32 | 1 | 149-1 (6.7) | 1.0 | AR52 (0.4) | AY73 (0.5) | — | 8.3 |
| 2-1 | 1 | 149-2 (6.7) | 1.0 | RHDB (0.5) | BY40 (0.4) | — | 8.3 |
| 2-2 | 2 | 149-1 (6.7) | 1.0 | RHDB (0.5) | — | — | 8.3 |
| 2-3 | 2 | 149-1 (13.4) | 2.0 | RHDB (0.5) | — | — | 8.3 |
| 3-1 | 1 | 149-3 (6.7) | 1.0 | RHDB (0.5) | BY40 (0.2) | — | 6.8 |
| 3-2 | 1 | 149-3 (6.7) | 1.0 | RHDB (0.5) | BY40 (0.4) | — | 6.8 |
| 3-3 | 1 | 149-3 (18.75) | 3.0 | RHDB (0.5) | BY40 (0.2) | — | 6.2 |
| 3-4 | 1 | 149-3 (25.0) | 4.0 | RHDB (0.5) | BY40 (0.2) | — | 6.4 |

TABLE 1-continued

INK COMPOSITION

| Sample No. | Vehicle | Pigment Dispersion (wt. %) | Wt % Pigment | Fluorescent Dye (wt %) | Other dye (wt. %) | Hydrotrope Additive (wt %) | pH |
|---|---|---|---|---|---|---|---|
| 3-5 | 1 | 149-3 (31.25) | 5.0 | RHDB (0.5) | BY40 (0.2) | — | 6.6 |
| 4-1 | 1 | 149-1 (6.7) | 1.0 | AR52 (0.5) | AY250 (0.4) | — | 8.3 |
| 4-2 | 1 | 149-1 (6.7) | 1.0 | AR52 (0.5) | AY250 (0.4) | Dowfax ® C6L (3.0) | 8.3 |
| 4-3 | 1 | 149-1 (6.7) | 1.0 | AR52 (0.5) | AY250 (0.2) | — | 8.3 |
| 4-4 | 1 | 149-1 (6.7) | 1.0 | AR52 (0.5) | AY250 (0.2) | Dowfax ® C6L (3.0) | 8.3 |
| 4-5 | 1 | 149-1 (6.7) | 1.0 | AR52 (0.5) | DY96 (0.4) | — | 8.3 |
| 4-6 | 1 | 149-1 (6.7) | 1.0 | AR52 (0.5) | DY96 (0.4) | Dowfax ® C6L (3.0) | 8.3 |
| 4-7 | 1 | 149-1 (6.7) | 1.0 | AR52 (0.5) | AY184 (0.4) | — | 8.3 |
| 4-8 | 1 | 149-1 (6.7) | 1.0 | AR52 (0.5) | AY184 (0.4) | Dowfax ® C6L (3.0) | 8.3 |
| 4-9 | 1 | 149-1 (6.7) | 1.0 | AR52 (0.5) | AY7 (0.4) | — | 8.3 |
| 4-10 | 1 | 149-1 (6.7) | 1.0 | AR52 (0.5) | AY7 (0.4) | Dowfax ® C6L (3.0) | 8.3 |
| 4-11 | 1 | 149-1 (6.7) | 1.0 | AR52 (0.5) | AY73 (0.5) | — | 8.3 |
| 4-12 | 1 | 149-1 (20.0) | 3.0 | AR52 (0.5) | AY73 (0.5) | Dowfax ® C6L (3.0) | 8.3 |
| 4-13 | 1 | 149-1 (20.0) | 3.0 | AR52 (0.5) | DY96 (0.4) | — | 8.3 |
| 4-14 | 1 | 149-1 (20.0) | 3.0 | AR52 (0.5) | DY96 (0.4) | Dowfax ® C6L (3.0) | 8.3 |
| 4-15 | 1 | 149-1 (20.0) | 3.0 | AR52 (0.5) | AY250 (0.4) | — | 8.3 |
| 4-16 | 1 | 149-1 (20.0) | 3.0 | AR52 (0.5) | AY250 (0.4) | Dowfax ® C6L (3.0) | 8.3 |
| 5-1 | 1 | 149-3 (6.7) | 1.0 | RHDB (0.5) | BY40 (0.4) | — | 6.8 |
| 5-2 | 1 | 149-3 (6.7) | 1.0 | RHDB (0.5) | BY40 (0.4) | Dowfax ® C6L (3.0) | 7.6 |
| 5-3 | 1 | 149-3 (6.7) | 1.0 | BV11 (0.25) | BY40 (0.2) | — | 3.5 |
| 5-4 | 3 | 149-3 (6.7) | 1.0 | BV11 (0.25) | BY40 (0.2) | Dowfax ® C6L (1.0) | 4.6 |
| 6-1 | 1 | 149-1 (6.7) | 1.0 | RHDB (0.5) | — | — | 8.3 |
| 6-2 | 1 | 149-1 (6.7) | 1.0 | RHDB (0.5) | BY40 (0.4) | Dowfax ® C6L (3.0) | 8.3 |
| 7-1 | 1 | 149-1 (6.7) | 1.0 | AR52 (0.4) | AY7 (0.4) | — | 8.3 |
| 7-2 | 1 | 149-1 (6.7) | 1.0 | AR52 (0.4) | AY7 (0.4) | Irgasol DA (3.0) | 8.3 |
| 7-3 | 1 | 149-1 (6.7) | 1.0 | AR52 (0.4) | AY7 (0.4) | 1,5,naphthalene disulfonate (3.0) | 8.3 |
| 7-4 | 1 | 149-1 (6.7) | 1.0 | AR52 (0.4) | AY7 (0.4) | 2,6,naphthalene dicarboxylate (3.0) | 8.3 |
| 7-5 | 1 | 149-1 (6.7) | 1.0 | AR52 (0.4) | AY7 (0.4) | Aerosol OS (3.0) | 8.3 |
| 7-6 | 1 | 149-1 (6.7) | 1.0 | AR52 (0.4) | AY7 (0.4) | Dowfax 2A (3.0) | 8.3 |
| 7-7 | 1 | 149-1 (6.7) | 1.0 | AR52 (0.4) | AY7 (0.4) | Dowfax 3B2 (3.0) | 8.3 |
| 7-8 | 1 | 149-1 (6.7) | 1.0 | AR52 (0.4) | AY7 (0.4) | Dowfax 8390 (3.0) | 8.3 |
| 7-9 | 1 | 149-1 (6.7) | 1.0 | AR52 (0.4) | AY7 (0.4) | Aerosol DPOS (3.0) | 8.3 |
| 7-10 | 1 | 149-1 (6.7) | 1.0 | AR52 (0.4) | AY7 (0.4) | Rhodacal BX78 (3.0) | 8.3 |
| 8-1 | 1 | 149-1 (6.7) | 1.0 | AR52 (0.4) | AY7 (0.4) | — | 8.3 |
| 8-2 | 1 | 149-1 (6.7) | 1.0 | AR52 (0.4) | AY7 (0.4) | Dowfax C6L (0.5) | 8.3 |
| 8-3 | 1 | 149-1 (6.7) | 1.0 | AR52 (0.4) | AY7 (0.4) | Dowfax C6L (1.0) | 8.3 |
| 8-4 | 1 | 149-1 (6.7) | 1.0 | AR52 (0.4) | AY7 (0.4) | Dowfax C6L (3.0) | 8.3 |
| 8-5 | 1 | 149-1 (6.7) | 1.0 | AR52 (0.4) | AY7 (0.4) | Dowfax C6L (5.0) | 8.3 |
| 8-6 | 1 | 149-1 (6.7) | 1.0 | AR52 (0.4) | AY7 (0.4) | Dowfax C6L (8.0) | 8.3 |

MATERIALS IDENTIFICATION LIST

| | |
|---|---|
| AR52 | sodium salt of acid red 52 dye, CI #45100 |
| AY7 | acid yellow 7 dye |
| AY250 | acid yellow 250 dye, Keystone fluorescent yellow AA225 (Keystone Aniline Corp.) |
| DY96 | direct yellow 7 dye, Keyamine flavine 7GFF (Keystone Aniline Corp.) |
| AY73 | fluorescein dye, sodium salt, CI #45350 |
| RHDB | rhodamine B, basic violet 10 dye |
| BY40 | basic yellow 40, CAS #12221-86-2 |
| Dowfax C6L | benzene, 1,1'-oxybis-sec-hexyl derivative, sulfonated sodium salt (Dow Chemical Corp.) |
| BV11 | basic violet 11:1 dye, Basonyl red 560 (BASF Corp.) |
| Irgasol DA | sulfonates of condensed naphthalenes (Ciba Geigy) |
| Aerosol OS | sodium diisopropylnapthalene sulfonate (Cytec Industries) |
| Dowfax 2A | benzene, 1,1'-oxybis-tetrapropylene derivative sulfonated sodium salt (Dow Chemical Corp.) |
| Dowfax 3B2 | decyl (sulfophenoxy) benzene sulfonic acid, disodium salt (Dow Chemical Corp.) |
| Dowfax 8390 | disodium hexadecyl diphenyloxide disulfonate/ disodium dihexadecyl diphenoxide disulfonate mixture (Dow Chemical Corp.) |
| Aerosol DPOS | sodium monodecylphenoxy benzene disulfonate/ sodium didodecylphenoxy benzene disulfonate mixture (Cytec Industries) |
| Rhodacal BX78 | naphthalene sulfonic acid, dibutyl, sodium salt (Rhone-Poulenc) |

Test Procedures:

The inks were evaluated with a series of tests described below. A commercially available ink jet based postal metering device approved by the US Postal Service (i.e., a Pitney Bowes® Personal Post Office™) was used as the comparative example.

Print Procedure

Inks prepared according to the above procedure were loaded into 300×600 dots per inch ("dpi") inkjet cartridges (HP model #51645A) and printed using a standard Hewlett Packard DeskJet 870Cxi printer at an drop volume of 30 picoliters. This simulated the results obtainable using a thermal inkjet-based postage meter. A test indicia substantially in the form as depicted in FIG. 1 was printed on Staples® non fluorescent white envelopes (#473009) and #10 Kraft business envelopes in the normal, upper right-hand corner. The design of the test indicia included sample numeric data in the meter number field so legibility could be assessed on an area of the indicia with small font size. Printed envelopes were dried about 12 hours before they were subject to solvent exposure.

Measuring Fluorescence of Indicia

Fluorescence was measured using an LM-2C Luminescence Meter obtained from the United States Postal Service. The meter measures fluorescence as a result of excitation with primarily 254 nm ultraviolet light and indicates the relative strength of the emission in Phosphor Meter Units (PMU). PMU readings are influenced by the ink composition, the envelope color, the length of time between printing the ink and making a measurement, and the emission band shape of the ink-paper combination. The Staples® brand envelope represents a common white reflective envelope surface. The standard Kraft paper envelopes represent a commonly used business media with relatively non-reflective surface.

The meter is turned on and warmed up for a period of 20–30 minutes, after which time the calibration is checked using the matched red fluorescent calibration plate. Printed indicia are measured after the ink has completely dried on the envelope, at which point the PMU readings reach their normal asymptotic value. The indicia is placed against the meter window and the position adjusted until the maximum PMU value is obtained with the sample door fully closed. The meter displays integer PMU values in the normal operating mode. Fluorescence is typically measured on three to five envelopes and averaged. Results are reported in Table 2. The comparative example produced a PMU reading of 68 on white envelopes and a reading of 8 on Kraft paper envelopes.

TABLE 2

INK FLUORESCENCE

| Sample | PMU White | PMU Kraft | Sample | PMU White | PMU Kraft | Sample | PMU White | PMU Kraft |
|---|---|---|---|---|---|---|---|---|
| 1-1 | 52 | 9 | 1-2 | 38 | 7 | 1-3 | 29 | 7 |
| 1-4 | 29 | 7 | 1-5 | 25 | 6 | 1-6 | 25 | 6 |
| 1-7 | 24 | 6 | 1-8 | 20 | 6 | 1-9 | 20 | 6 |
| 1-10 | 15 | 6 | 1-11 | 13 | 5 | 1-12 | 13 | 5 |
| 1-13 | 16 | 6 | 1-14 | 11 | 4 | 1-15 | 7 | 4 |
| 1-16 | 13 | 5 | 1-17 | 7 | 4 | 1-18 | 5 | 3 |
| 1-19 | 31 | 7 | 1-20 | 27 | 7 | 1-21 | 29 | 7 |
| 1-22 | 29 | 7 | 1-23 | 39 | 7 | 1-24 | 25 | 7 |
| 1-25 | 20 | 5 | 1-26 | 16 | 7 | 1-27 | 25 | 7 |
| 1-28 | 17 | 6 | 1-29 | 13 | 5 | 1-30 | 9 | 4 |
| 1-31 | 30 | 7 | 1-32 | 34 | 7 | 2-1 | 45 | 8 |
| 2-2 | 42 | 7 | 2-3 | 19 | 5 | 3-1 | 50 | 11 |
| 3-2 | 59 | 11 | 3-3 | 31 | 9 | 3-4 | 23 | 8 |
| 3-5 | 18 | 7 | 4-1 | 29 | 7 | 4-2 | 44 | 12 |
| 4-3 | 30 | 7 | 4-4 | 45 | 10 | 4-5 | 35 | 7 |
| 4-6 | 49 | 10 | 4-7 | 25 | 6 | 4-8 | 38 | 9 |
| 4-9 | 27 | 7 | 4-10 | 44 | 9 | 4-11 | 16 | 7 |
| 4-12 | 30 | 10 | 4-13 | 22 | 16 | 4-14 | 38 | 10 |
| 4-15 | 22 | 6 | 4-16 | 33 | 7 | 5-1 | 59 | 11 |
| 5-2 | 78 | 15 | 5-3 | 24 | 4 | 5-4 | 39 | 10 |
| 6-1 | 42 | 7 | 6-2 | 48 | 10 | 7-1 | 25 | 6 |
| 7-2 | 42 | 8 | 7-3 | 32 | 8 | 7-4 | 28 | 9 |
| 7-5 | 36 | 7 | 7-6 | 30 | 7 | 7-7 | 49 | 9 |
| 7-8 | 26 | 7 | 7-9 | 30 | 7 | 7-10 | 29 | 7 |
| 8-1 | 34 | 7 | 8-2 | 39 | 8 | 8-3 | 38 | 7 |
| 8-4 | 42 | 9 | 8-5 | 50 | 10 | 8-6 | 59 | 11 |

Ink Sample 1-18 produced a PMU reading of only 5 on white envelopes and a reading of 3 on kraft envelopes. Of all the sample formulations tested, that is the only one that falls below the goal fluorescence measurement of 7 PMU on white envelopes.

Water Fastness Test

A 24 hour water soak test was conducted to determine if indicia printed with ink of the current invention were legible following long-term exposure. Individual envelopes were printed with sample ink #1-32 and allowed to dry for about 12 hours. Each envelope was submerged in one liter of distilled water for 24 hours and dried under ambient conditions. The effect of the long-term water soak on the meter number was determined using a numeric scale (5-no effect, 4-slight removal or blurring, 3-moderate removal, 2-heavy removal, 1-total removal or no longer legible). Illegible indicia were given a score of 1 and indicated that the meter number field was exceptionally difficult or impossible to read under office lighting conditions with the unaided eye.

The results of the water fastness test for three commercial white envelopes are shown in Table 3. Indicia printed with ink of the current invention show good resistance to long-term water exposure and are consistently more fast than the comparative example. A striking difference is observed for soaking on the First Choice envelope. The comparative example is very difficult to read after the soaking process but the ink from the current invention remains clearly legible.

TABLE 3

WATERFASTNESS DATA

| ENVELOPE TYPE | SAMPLE NO. 1–32 | PITNEY BOWES ® INK |
|---|---|---|
| White Wove, Blue Inside Tint (Unisouce) | 3 | 2 |
| White Wove Recycle, #32308 (Williamhouse) | 3 | 2 |
| First Choice White, #22630 (Williamhouse) | 3 | 1 |

Solvent Fastness Test

Four organic and aqueous solvents were applied to the indicia to determine the extent to which the prints were resistant to tampering. Approximately two milliliters of the test solvent were applied to a clean cotton ball with a plastic pipette. The cotton ball was rubbed lightly back and forth across the indicia ten times in the area of the meter number field. The effect of the solvent on the meter number was determined within thirty minutes using a numeric scale (5-no effect, 4-slight removal or blurring, 3-moderate removal, 2-heavy removal, 1-total removal or no longer legible). Illegible indicia were given a score of 1 and indicated that the meter number field was difficult or impossible to read under office lighting conditions with the unaided eye.

The results of the solvent fastness test for the four most different solvents are shown in Table 4. Indicia printed with ink of the current invention (Sample #1-32) show better resistance to tampering than those printed with the comparative example ink. A striking difference is observed for tamper resistance using hypochlorite bleach. The comparative example is completely obliterated by the process but the ink from the current invention remains legible.

TABLE 2

SOLVENT RESISTANCE TEST

| Test Solvent | Sample No. 1–32 | Pitney Bowes ® Ink |
|---|---|---|
| Glacial Acetic Acid | 4 | 2 |
| 2-Ethoxyethanol | 5 | 4 |
| CLOROX ® bleach | 3 | 1 |
| Distilled water | 3 | 4 |

What is claimed is:

1. An ink jet ink composition comprising;
   a) an aqueous vehicle;
   b) at least one pigment selected from the group consisting of red pigments and magenta pigments;

c) a polymeric dispersant; and d) a fluorescent dye;

wherein said ink is suitable for use in metering mail.

2. The ink of claim 1, wherein said fluorescent dye is a red dye and wherein said ink futer comprises an additional dye selected from red dyes and yellow dyes.

3. The ink of claim 1, wherein said ink further comprises at least one yellow pigment.

4. The ink of claim 1, wherein the fluorescent dye and the polymeric dispersant have the same ionic character.

5. The ink of claim 1, wherein the fluorescent dye and the polymeric dispersant have opposite ionic characters.

6. The ink of any of claims 1, 2, 3, 4, or 5, wherein the polymeric dispersant is a structured polymer selected from the group consisting of block copolymers and graft copolymers.

7. The ink of any of claims 1, 2, 3, 4, or 5, wherein said ink composition further comprises from 0.5 to 10% by weight, based on the weight of the ink composition, of a hydrotrope additive selected from the group consisting of sulfonated diphenyl ether hydrotropes, sulfonated naphthalene hydrotropes, carboxylated naphthalene hydrotropes, condensed naphthalene sulfonate polymers and combinations thereof.

8. The ink of claim 6, wherein said ink composition further comprises from 0.5 to 10% by weight, based on the weight of the ink composition, of a hydrotrope additive selected from the group consisting of sulfonated diphenyl ether hydrotropes, sulfonated naphthalene hydrotropes, carboxylated naphthalene hydrotropes, condensed naphthalene sulfonate polymers and combinations thereof.

* * * * *

UNITED STATES PATENT AND TRADEMARK OFFICE
CERTIFICATE OF CORRECTION

PATENT NO. : 6,176,908 B1
DATED : January 23, 2001
INVENTOR(S) : Bauer et al.

Page 1 of 1

It is certified that error appears in the above-identified patent and that said Letters Patent is hereby corrected as shown below:

<u>Column 13, claim 2,</u>
Line 5, delete "future" and insert therefor -- further --.

Signed and Sealed this

Twenty-seventh Day of November, 2001

Attest:

*Attesting Officer*

NICHOLAS P. GODICI
*Acting Director of the United States Patent and Trademark Office*